United States Patent Office 2,911,067
Patented Nov. 3, 1959

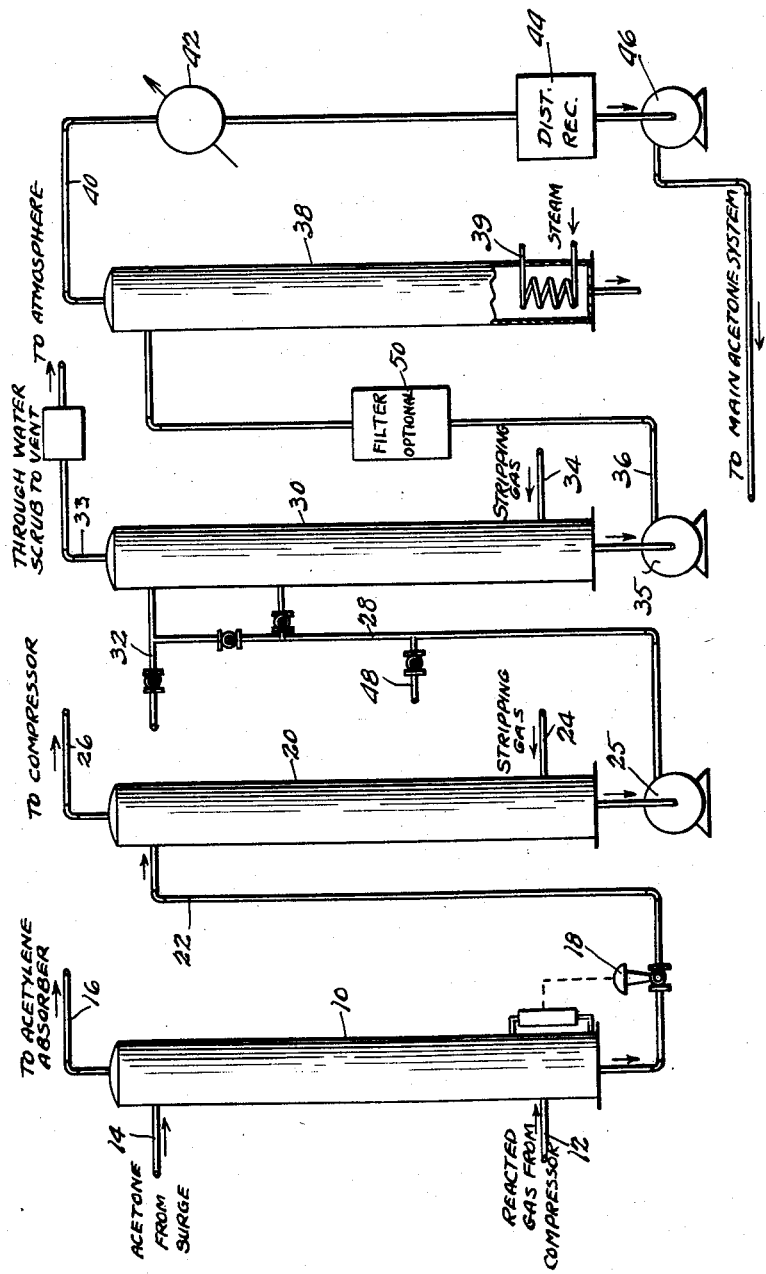

2,911,067

PROCESS FOR THE REGENERATION OF ACETYLENE ABSORBING LIQUIDS

Joseph E. Bludworth, Corpus Christi, and Clyde A. Leatherwood, Brownsville, Tex., assignors to Delhi-Taylor Oil Corporation, Dallas, Tex., a corporation of Delaware Application October 7, 1955, Serial No. 539,252

12 Claims. (Cl. 183—115)

This invention relates to a process for the regeneration of an organic absorbing liquid, and more particularly pertains to a process for the removal of acetylene and its homologues from acetone. Previously it had been the practice to strip acetylene dissolved in acetone by means of a gas inert to the acetone absorbent and the gases dissolved therein. Although the acetylene was removed, only small amounts of the acetylene homologues and polymers were removed, necessitating additional caustic treatment and distillation steps if the acetone was to be recovered in a pure state. The resulting acetone was pure but the solid polymers which were formed during the course of the homologue removal caused considerable trouble in that they were gumlike in nature and therefore removable only with great difficulty.

This invention has as an object, therefore, the provision of a continuous process for the removal of acetylene and its homologues from an organic absorbent in which the acetylene homologues are readily removed as gases.

It is a further object of this invention to provide an absorbent regeneration process in which the final absorbent product is of high purity.

A further object of this invention is the provision of a solvent absorption process for acetylene in which at least a portion of the solvent is treated to remove acetylene homologues and polymers prior to recycle to the system.

It is another object of this invention to provide an organic absorbent regeneration process in which the formation of solid acetylene polymers is substantially obviated, thereby facilitating the final absorbent-acetylene polymer separation.

It is a still further object of this invention to provide an absorbent regeneration process in which only water need be employed as the agent reducing the solubility of the acetylene homologues in the absorbent, thereby enhancing the overall economic feasibility of the process.

Further and additional objects will appear from the following description, the accompanying drawing and the appended claims.

In accordance with one embodiment of this invention an organic absorbent having acetylene and its homologues dissolved therein is passed into a first stripping tower in countercurrent engaging flow with a stripping gas which is inert to the absorbent and the gases dissolved therein. The stripping gas removes substantially all of the acetylene but very little of the acetylene homologues and polymers contained therein; the overhead gaseous discharge is cycled for acetylene recovery. The acetone bottoms containing acetylene homologues dissolved therein are mixed with water to force the normally gaseous acetylene homologues such as methyl acetylene and gaseous polymers such as diacetylene to come out of solution, as a result of their reduced solubility in the diluted acetone. The diluted bottoms from the first tower are then passed into a second stripping tower in countercurrent engaging flow with a second quantity of stripping gas. The overhead gaseous discharge from the second stripping tower comprising inert gas and acetylene homologues and polymers is washed and vented to the atmosphere. The acetone and water bottoms emerging from the second stripping tower are passed into a distillation tower in which the acetone may be distilled from the water in a state of high purity.

In a modification of the above process, additional acetone essentially free of acetylene but containing some methyl acetylene may be mixed with the bottoms from the first acetone stripping tower to effect removal of methyl acetylene therefrom in the second stripping tower.

As a second modification of the above process the acetone-water bottoms from the second stripping tower may be filtered to remove any high molecular weight polymers which may have precipitated out during the acetone dilution step, prior to passing the bottoms into the distillation zone.

For a more complete understanding of this invention, reference will now be made to the accompanying drawing which is a flow plan of the solvent regeneration process.

Referring now to the flow sheet, a gaseous stream containing acetylene and its homologues is shown entering a packed tower or column 10 by means of a line 12. The gaseous stream may be produced in accordance with any of the processes for the production of acetylene by the partial combustion of hydrocarbons, and may be produced in accordance with the teaching of copending Joseph C. Bludworth application Serial No. 224,540, filed May 4, 1951, now Patent No. 2,785,213, issued March 12, 1957. Such a gas suitably contains acetylene, hydrogen, carbon monoxide, and small amounts of other gases including the polymers and homologues of acetylene. Prior to entering the contacting column 10, the gaseous stream containing the gases of reaction from an acetylene-producing process are compressed to approximately 200 pounds pressure per square inch. The gases entering the bottom of the column 10 countercurrently contact a downwardly flowing stream of acetone or other suitable organic absorbent entering the top of the contacting column 10 at a point adjacent the outlet of the gaseous effluent. Among the organic absorbents which may be used other than acetone are acetaldehyde, acetonitrile, nitrobenzene, chlorinated hydrocarbons, polyglycols, and their esters, or any others known in the art for absorbing acetylene from gases of this character.

The absorbent stream which enters the column 10 through an inlet 14 in the course of countercurrently engaging the upwardly flowing gases containing acetylene and its homologues absorbs a small percentage of the acetylene and substantially all of the acetylene homologues and polymers. These homologues are normally gaseous in nature and comprise essentially, diacetylene, methyl acetylene, and vinyl acetylene. The gaseous effluent emerging from the column 10 through line 16, contains primarily acetylene and inert gases which are cycled for acetylene recovery to a second acetylene-absorbing zone in the usual manner. The acetone bottoms from the tower 10 contain approximately 10 percent of the acetylene and substantially all of the acetylene homologues and polymers contained in the reaction gases entering the tower through the line 12 from the compressor.

Adjacent the lower end portion of the absorbing tower 10 is a liquid level control valve 18 which reduces the pressure of the outgoing acetone stream to a pressure which is sufficient to force the process liquid into a first stripping tower 20. The acetone bottoms emerging from the absorbing column 10 are passed into the packed stripping column 20 by means of a line 22. The downwardly flowing acetone stream which contains the acetylene homologues and polymers, countercurrently contacts an upwardly flowing stream of stripping gas which enters the column 20 through line 24. The stripping gas is inert to both the acetone and the gases dissolved therein and, in the course of its upward movement through the tower strips off the acetylene present in the acetone bottoms; negligible amounts of diacetylene and methyl acetylene are also driven off. This gaseous overhead emerging from tower 20 through line 26 is recycled to the compressor (not shown) from which it once more enters contacting tower 10 through line 12, whereby the acetylene values contained therein may be recovered.

The acetone bottoms containing the major proportion of the acetylene polymers and homologues from the tower 20 are forced by a pump 25 through line 28 to a second stripping column 30. However, prior to entrance into the column 30, the acetone is diluted with water, which is conveyed by means of valved line 32. The acetone should be diluted to the extent that the normally gaseous acetylene homologues and polymers are no longer soluble in the acetone and are, therefore, enabled to be driven off as gases in the overhead gaseous discharge through line 33. Diluting the acetone bottoms to effect about a 15–50% acetone solution is generally sufficient to insure substantially complete removal of the gaseous acetylene polymers and homologues. This stripping action is effected by means of a suitable gas entering the column 30 through line 34. The volume of stripping gas utilized in both columns 20 and 30 is approximately 25 to 50 standard cubic feet for each gallon of absorbent solution.

It should at this time be noted that the removal of the acetylene polymers and homologues as gases is an important feature of the provided process. By prior art methods the absorbent for acetylene, its homologues and polymers, was processed so that the homologues and polymers precipitated out as hard-to-remove gums and tars. In accordance with the present process, however, the undesirable homologues and polymers are readily driven off as gases, leaving the remaining absorbing fluid free of difficult-to-remove tars and gums, thereby obviating additional processing steps and the expense thereof.

The bottoms from stripping tower 30 are thus seen to contain acetone and water which are removed from the tower by means of pump 35 and thence through line 36. The acetone-water mixture then passes into distillation column 38 heated by steam coils 39 wherein the acetone is driven overhead through line 40, liquefied in condenser 42, and then passed into a receiving vessel 44 from which it may be recycled to the main acetone system by means of a pump 46.

As a modification of the above process, a portion of the acetone stream from the main acetylene absorption system (not shown) essentially free of acetylene and containing some homologues or polymers such as methyl acetylene may enter the line 28 by means of a valved line 48, as the acetone bottoms of stripping column 20 are in the process of being passed into the stripping column 30. It will be appreciated that the homologues and polymers will also be removed from this stream in the tower 30.

An additional modification of the above process, which may be utilized in combination with the above modification, is the provision of a filter 50 interposed in the line 36 between stripping column 30 and the distillation column 38. Although the acetylene polymers and homologues contained in the acetone or other organic absorbent are normally gaseous, some high molecular weight polymers may precipitate out as solids upon diluting the organic absorbent with water. Consequently, to remove these solids the interposing of a filter 50 between column 30 and distillation column 38 facilitates the final processing steps of the acetone-water mixture.

For a more complete understanding, reference will now be made to the following example illustrating the manner of carrying out this invention.

About 5,000 standard cubic feet per hour of reaction gases equivalent to approximately 700 standard cubic feet per hour of acetylene (both calculated at normal atmospheric pressure and temperature) are passed into the bottom of the absorbing column 10 at about 200 p.s.i.g. in countercurrent contacting flow relationship with from 6 to 10 gallons per hour of acetone entering the top of the tower. The acetone bottoms containing approximately 10 percent acetylene and substantially all of the acetylene polymers and homologues are passed through the liquid level controlled pressure-reducing valve 18 into the first stripping tower 20 in countercurrent contacting flow with 27.5 cubic feet of stripping gas for every gallon of acetone. The tower 20 is maintained at about 5 p.s.i.g. The acetone bottoms from the first stripping tower contain approximately 2.9 percent by weight acetylene homologues, calculated as acetylene, which are then diluted with water to give an acetone content of 20 percent by weight in tower 30. This diluted acetone stream containing the acetylene homologues and polymers is also stripped with 27.5 cubic feet of stripping gas for every gallon of acetone in a second stripping tower. The resulting acetone bottoms emerging from the second stripping column 30 are distilled; the resulting acetone distillate contains 0.02 percent acetylenes by weight.

It is thus seen that an improved process for the regeneration of an organic absorbent containing acetylene, its homologues and polymers, has been provided which is readily adaptable to large scale, commercial operations. The undesirable polymers and homologues of acetylene, which heretofore had been removed only as gums or tars are now removed, in accordance with the provided process, as a gas leaving and remaining acetone absorbing liquid or other organic absorbent in a ready state for recycling and reuse. In addition, no additional chemicals are needed to bring the homologues and polymers out of solution with the absorbing liquid. The provided process effects the separation by the mere use of water which dilutes the absorbing liquid and thus causes the dissolved homologues and polymers to assume their normal gaseous state. The stripping gases used in towers 20 and 30 may be air, nitrogen, methane, natural gas or, as previously suggested, any gas that is inert to the absorbing liquid and the acetylenic compounds.

While several particular embodiments of this invention are shown above, it will be understood, of course, that the invention is not to be limited thereto, since many modifications may be made, and it is contemplated, therefore, by the appended claims, to cover any such modifications as fall within the true spirit and scope of this invention,

We claim:

1. A process for removing acetylene homologues and polymers from an organic absorbing liquid containing acetylene homologues and polymers dissolved therein comprising the steps of reducing the solubility of acetylene homologues and polymers in the absorbing liquid by diluting the absorbing liquid with water until said acetylene homologues and polymers are no longer soluble therein, stripping the acetylene homologues and polymers from said absorbing liquid by passing an inert gas therethrough, and separating the water from the absorbing liquid.

2. The process as recited in claim 1 in which the organic absorbing liquid is acetone.

3. A process for removing acetylene homologues and polymers from an organic absorbing liquid comprising the steps of reducing the solubility of acetylene homologues and polymers in the organic absorbing liquid by diluting the organic absorbing liquid with water until said acetylene homologues and polymers are no longer soluble therein, removing any normally solid acetylene homologues and polymers from said organic absorbing liquid by filtration, removing the normally gaseous acetylene polymers and homologues from said organic absorbing liquid by passing said liquid in countercurrent contacting flow with an inert stripping gas, and removing the water from the resulting diluted organic absorbing liquid.

4. A process for removing acetylene and acetylene homologues from acetone which comprises passing under superatmospheric pressure acetone having acetylene and its homologues dissolved therein into a first stripping zone of lesser superatmospheric pressure in countercurrent contacting flow with a first quantity of stripping gas, cycling the overhead acetylene enriched stripping gas to an acetylene recovery station, mixing the acetone bottoms with water, passing the acetone bottoms-water mixture into a second stripping zone in countercurrent contacting flow with a second quantity of stripping gas, passing the resulting gases overhead, and separating said resulting acetone-water bottoms into water and acetone by fractional distillation.

5. A process for regenerating an organic absorbing liquid having acetylene homologues and acetylene polymers dissolved therein which comprises passing an organic absorbing liquid containing normally gaseous acetylene polymers and homologues into a first stripping zone in countercurrent contacting flow with a first quantity of stripping gas, cycling the gaseous overhead for recovery, diluting the organic absorbing liquid with water until the normally gaseous acetylene polymers and homologues are no longer soluble therein, passing the diluted organic absorbing liquid into a second stripping zone in countercurrent contacting flow with a second quantity of stripping gas whereby said normally gaseous acetylene polymers and homologues are driven off in the gaseous overhead, and fractionally distilling the resulting bottoms to separate the organic absorbing liquid from the water mixed therewith.

6. The process as recited in claim 5 in which said organic absorbing liquid is acetone.

7. A process for regenerating acetone containing acetylene and its homologues which comprises passing under pressure acetone containing acetylene and its homologues into a first stripping zone of lesser pressure in countercurrent contacting flow with a first quantity of stripping gas, cycling the overhead acetylene-enriched stripping gas for further processing, mixing the acetone bottoms with water, passing the acetone bottoms-water mixture into a second stripping zone in countercurrent contacting flow with a second quantity of stripping gas, washing the resulting gaseous overhead and passing it to the atmosphere, filtering the resulting acetone-water bottoms, and separating said resulting acetone-water bottoms into water and acetone by fractional distillation.

8. A process for regenerating acetone containing acetylene and its homologues which comprises passing under pressure acetone containing acetylene and its homologues into a first stripping zone of lesser pressure in countercurrent contacting flow with a first quantity of stripping gas, cycling the overhead acetylene-enriched stripping gas for further processing, adding substantially acetylene-free acetone to said bottoms whereby acetylene homologues contained therein may be removed thereby, mixing the acetone bottoms with water, passing the acetone bottoms-water mixture into a second stripping zone in countercurrent contacting flow with a second quantity of stripping gas, passing the resulting gases overhead, filtering the resulting acetone-water bottoms, and separating said resulting acetone-water bottoms into water and acetone by fractional distillation.

9. A process for removing acetylene homologues and acetylene polymers from an organic absorbing liquid which comprises passing an absorbing liquid containing acetylene, acetylene polymers and homologues into a first stripping zone in countercurrent contacting flow with a first quantity of stripping gas, cycling the gaseous overhead for recovery of the acetylene values contained therein, diluting the organic absorbing liquid bottoms with water until the normally gaseous polymers and homologues and the normally solid high molecular weight polymers are no longer soluble in the organic absorbing liquid bottoms, filtering the bottoms whereby the normally solid polymers are removed from the absorbing liquid, passing the bottoms into a second stripping zone in countercurrent contacting flow with a second quantity of stripping gas whereby said normally gaseous polymers and homologues are driven off in the gaseous overhead, and fractionally distilling the resulting bottoms whereby the organic absorbing liquid is separated from the water of dilution mixed therewith.

10. The process as recited in claim 9 in which said absorbing liquid is acetone.

11. A process for regenerating acetone containing acetylene and acetylene homologues which comprises passing acetone containing acetylene and its homologues into a first stripping zone in countercurrent contacting flow with a first quantity of stripping gas, cycling the gaseous overhead for further processing, mixing the acetone bottoms containing acetylene homologues with water, passing the bottoms-water mixture into a second stripping zone in countercurrent contacting flow with a second quantity of stripping gas, passing the gaseous overhead from said second stripping zone to the atmosphere, and separating the resulting acetone-water bottoms into its acetone and water constituents.

12. A process for regenerating an organic absorbing liquid containing acetylene and acetylene homologues which comprises passing said organic-absorbing liquid containing acetylene and its homologues into a first stripping zone in countercurrent contacting flow with a first quantity of stripping gas, cycling the gaseous overhead for further processing, mixing the organic-absorbing liquid bottoms containing acetylene homologues with water, passing the bottoms-water mixture into a second stripping zone in countercurrent contacting flow with a second quantity of stripping gas, passing the gaseous overhead from said second stripping zone to the atmosphere, and separating the resulting bottoms from said second stripping zone into its organic absorbing liquid and water constituents.

References Cited in the file of this patent

UNITED STATES PATENTS

| | | |
|---|---|---|
| 1,422,182 | Curme | July 11, 1922 |
| 2,250,925 | Babcock | July 29, 1941 |
| 2,715,947 | Alexander | Aug. 23, 1955 |
| 2,738,859 | Bartholome et al. | Mar. 20, 1956 |
| 2,738,860 | Lorenz et al. | Mar. 20, 1956 |
| 2,838,133 | Schreiner | June 10, 1958 |